S. N. E. PRIDDY.
TRACTION PLOW.
APPLICATION FILED MAR. 2, 1908.
907,173.
Patented Dec. 22, 1908.
3 SHEETS—SHEET 1.
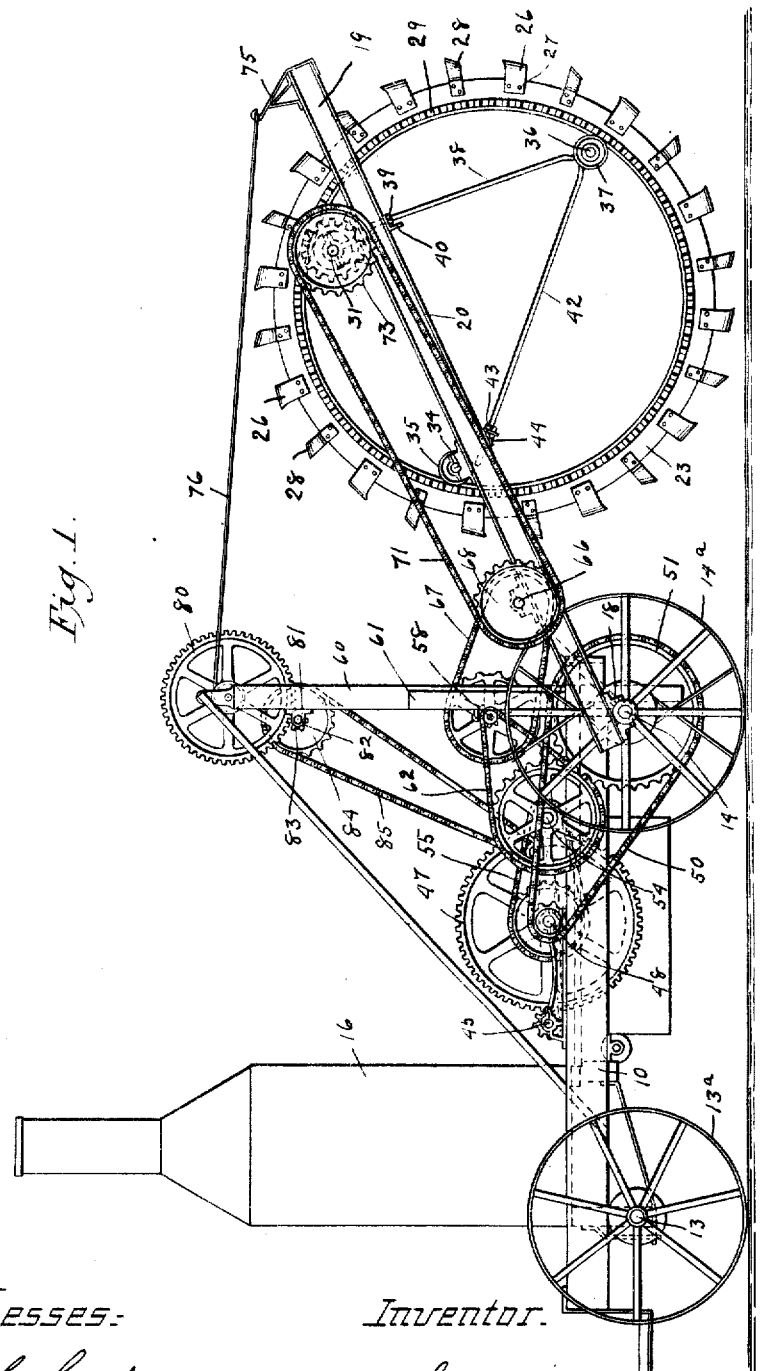
Witnesses:
A. L. Lord.
V. L. Fisher.
Inventor.
Seabury N. E. Priddy
by Brockett & Kwis
Attorneys.

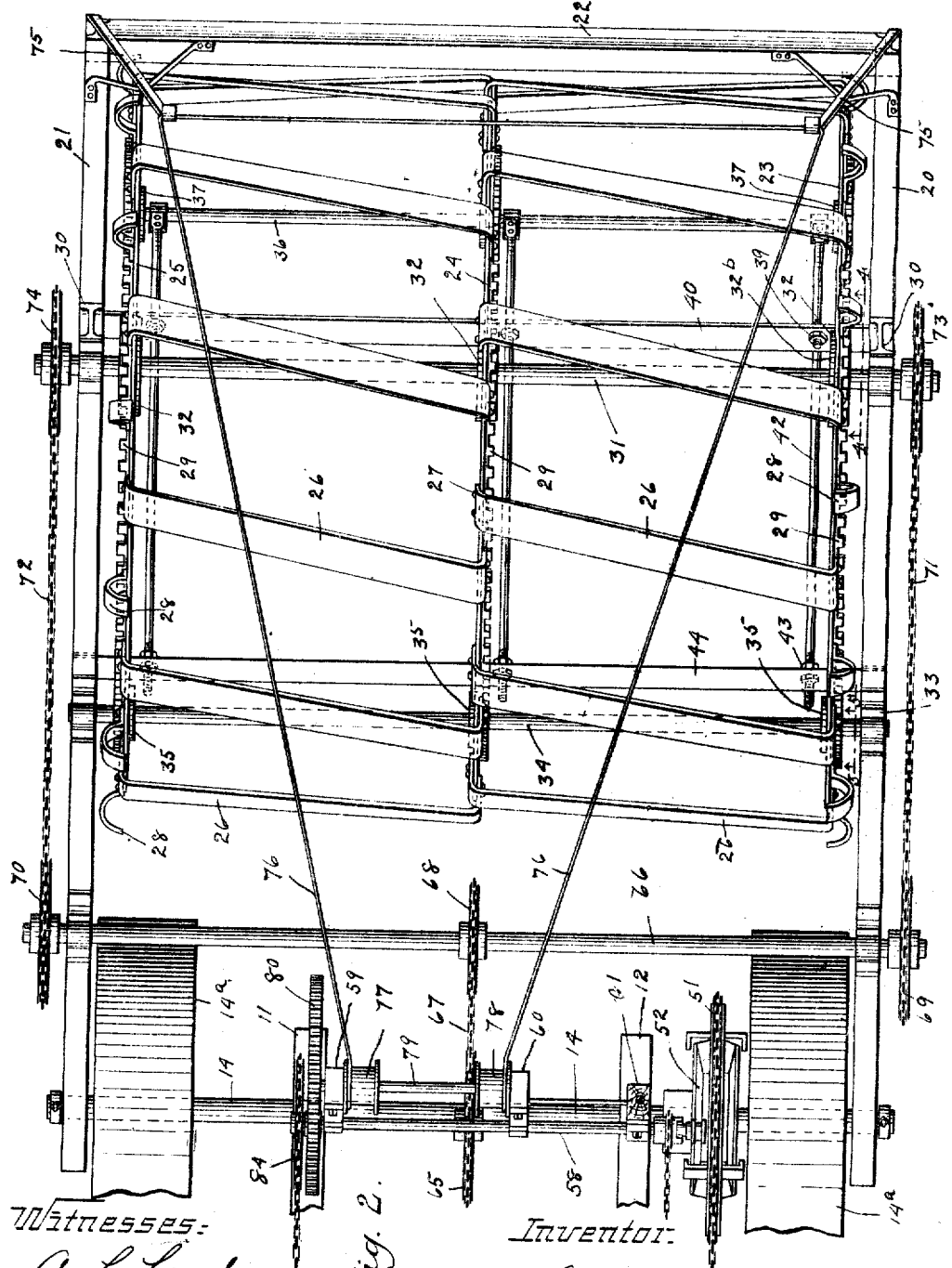

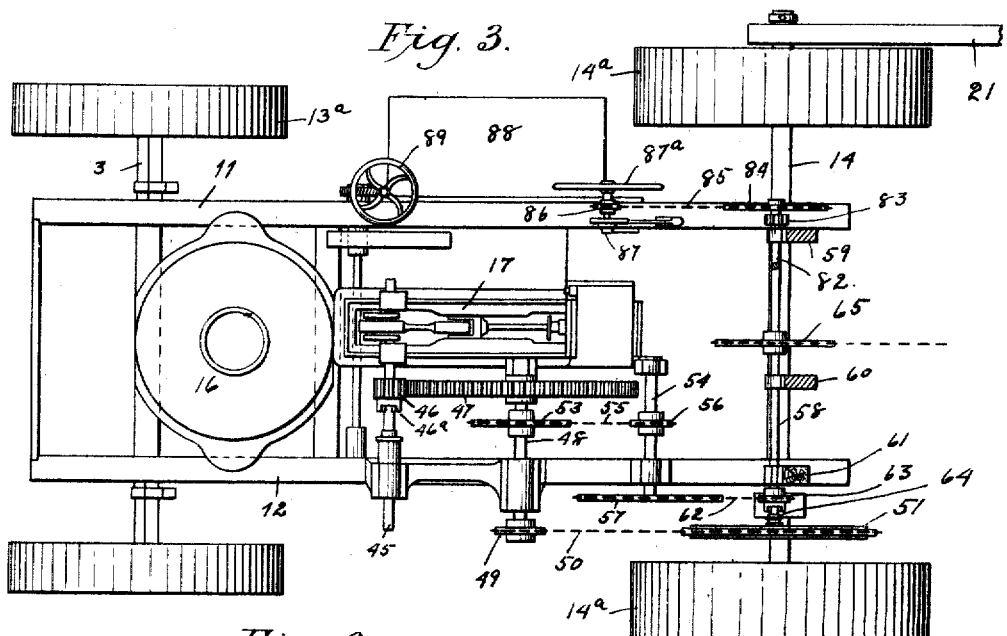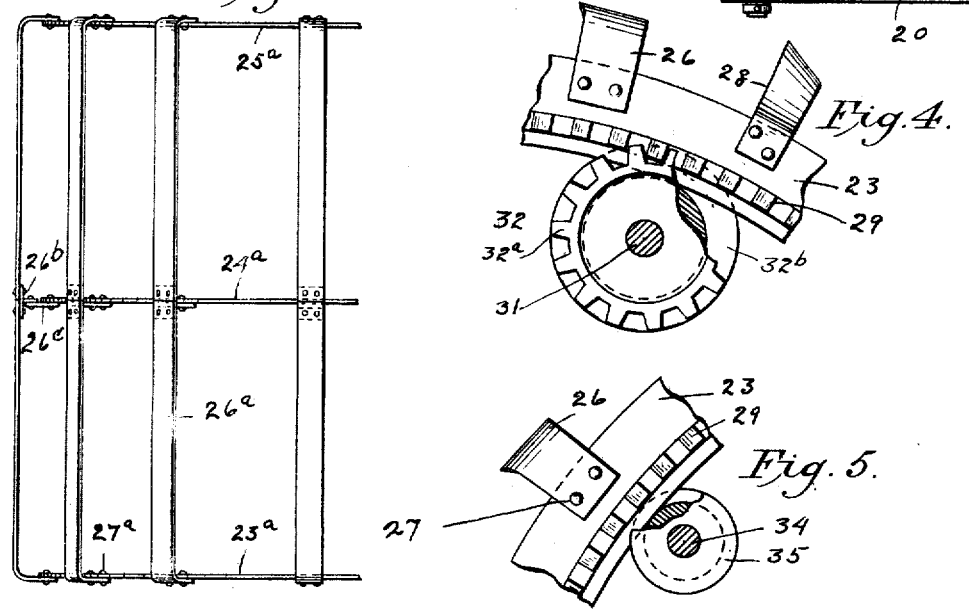

UNITED STATES PATENT OFFICE.

SEABURY N. E. PRIDDY, OF FINDLAY, OHIO.

TRACTION-PLOW.

No. 907,173.　　　Specification of Letters Patent.　　　Patented Dec. 22, 1908.

Application filed March 2, 1908. Serial No. 418,831.

*To all whom it may concern:*

Be it known that I, SEABURY N. E. PRIDDY, citizen of the United States, residing at Findlay, in the county of Hancock and State of Ohio, have invented certain new and useful Improvements in Traction-Plows, of which the following is a specification.

This invention relates to traction plows and is designed as an improvement over the common mold board, disk, or other forms of plows, which have been used heretofore.

One of the objects of my invention is to provide a traction plow which will plow or prepare for seeding a large section of the ground at one time.

A further object is to provide a traction plow having a rotary cutting member which will be under absolute control of the operator at all times, which is strong and durable and can be operated effectively with an expenditure of a minimum amount of power.

In carrying out my invention I provide a traction plow having a large rotary cutter in the form of a hollow drum or cylinder which has at its periphery a large number of transverse cutting blades or knives and which is rotatably mounted in a frame pivotally supported in some manner upon the truck, which frame is arranged to be raised or lowered about its pivotal axis, so as to vary the depth of cut or to raise the cutting member out of operating position.

The invention relates particularly to the form and construction of the cutting member, and to the means for supporting, bracing and driving the same. As the cutting member is preferably constructed it comprises three or more flat rims or rings of large diameter and arranged in parallel planes, across which rings the cutting blades extend. The cutting member is supported in the pivoted cutter frame by series or sets of grooved rollers, which are arranged to engage the inner peripheries of these rings, the rollers being supported in some manner upon the cutter frame, and it is preferably driven by means of toothed members which are secured to the flat faces of the rings, and are engaged by gear members connected by a suitable driving mechanism to the engine shaft.

The invention also consists in certain novel details of construction and combination and arrangement of parts, which will be described in the specification and set forth in the appended claims.

For a better understanding of my invention reference is had to the accompanying drawings, in which—

Figure 1 is a side elevation of a traction plow forming the subject matter of my invention; Fig. 2 is an enlarged plan view of the cutter member and a portion of the truck frame and driving mechanism; Fig. 3 is a plan view of the truck frame including the engine and other parts of the operating and driving mechanism, the latter being shown somewhat conventionally and parts of the raising and lowering mechanism of the cutter frame being removed for the sake of clearness; Fig. 4 is a sectional elevation substantially along the line 4—4 of Fig. 2 showing in detail a portion of the cutting member and one of the combined driving gears and supporting rollers; Fig. 5 is a sectional elevation substantially along the line 5—5 of Fig. 2 looking in the direction indicated by the arrow, showing in detail a portion of the cutter and one of the grooved supporting rollers; and Fig. 6 shows a portion of the modified form of cutting member.

Referring now to the figures of the drawing, 10 represents the traction truck having two longitudinal side beams 11 and 12, which support front and rear axles 13 and 14, on which are mounted the front ground wheels 13ª and the rear ground wheels 14ª. Supported on the truck is a boiler 16 and driving engine 17, which as will be explained is geared to the rear driving axle and to the cutting member. Pivotally mounted upon the outer ends of the rear axle 14 by means of box bearings 18 is a cutter frame 19, which is rectangular in form and comprises two arms 20 and 21 spaced a considerable distance apart and joined at the outer free end by a cross member 22. Rotatably mounted upon the arms 20 and 21 of the pivoted cutter frame is a cutting member in the form of a hollow drum or cylinder, which consists in this case of a number of spaced parallel flat rings or rims, three being shown in this case, designated respectively 23, 24 and 25, and a number of flat cutter blades or knives designated in Figs. 1, 2, 4 and 5 as 26. These cutter blades which are formed of tempered tool steel and are sharpened or beveled at the front edges, may be arranged in various ways upon the rings, either carried straight across from one end of the cutting member to the other or they may be diagonally arranged. In the preferred construction, the latter arrangement is employed as is shown in the above enumerated figures. In this instance the cutter blade extends from the outer rings to the middle ring, the blades of the two halves of the cutting member being staggered as well as diagonally arranged, and are secured to the rings at their ends which are bent at right angles along the sides thereof by means of bolts or rivets 27.

Secured to the outer rings 23 and 25 of the cutting member intermediate the cutter blades 26 are clearance cutters 28, the purpose of which is simply to form a clearance in the earth for the outer rings when the cutting member is in operation. Each of the rings of the cutting member is provided on one side with a circular toothed driving member 29 which is preferably a separate steel casting bolted thereto. If desired each circular toothed member may be formed of a plurality of separate segments arranged end to end to form a circle. While I have shown the cutting member as having three rings, it is to be understood that it may be formed of a different number of rings, the number of rings depending upon the size of the cutting member or the conditions to be encountered.

As was stated before the cutting blades instead of being spirally arranged may extend straight across the cutting member. This construction is shown in Fig. 6. The cutting member here shown has three flat rings $23^a$, $24^a$ and $25^a$ which support cutters $26^a$. The cutters are secured to the outer rings $23^a$ and $25^a$ by rivets $27^a$ and at the middle of the cutting member the cutters are secured to flanges of T-irons $26^b$, the vertical flanges of which are secured to the middle ring $24^a$ by flat plates $26^c$. As here shown each of the cutters consists of two parts which extend from the outer rings to the middle ring.

The cutting member is well braced and firmly supported so as to rotate in the frame by means including sets of grooved rollers arranged to engage the inner peripheries or edges of the rings. In this case there are three sets of the rollers engaging the inner peripheries of the rings at different points as will now be described. Extending transversely of the frame through the cylindrical cutting member and supported in bearings 30 on the top of the beams 20 and 21 is a shaft 31, which serves both as a driving shaft and a supporting shaft. Mounted on this shaft in the planes of the rings are three driving and supporting members 32, each having a toothed portion $32^a$ which engages the circular toothed member on the face of the corresponding ring so as to form a driving connection between the shaft 31 and the cutting member, and a portion $32^b$ in the form of a hub which is provided with a groove which engages the inner periphery of the ring. Also supported in bearings 33 on the top of the beams 20 and 21 and extending through the cutting member a suitable distance from the shaft 31 is a second shaft 34 on which is mounted a second set of grooved supporting rollers 35 which also engage the inner edges or peripheries of the rings. Located near the lower portion of the cutting member and extending through the same is a third shaft 36 on which are mounted a third set of grooved supporting rollers 37, said shaft being braced and supported from the cutter frame by means of rods 38, which extend upward and are secured at their upper ends by means of nuts 39 in an angle iron 40 extending transversely of and secured to the underside of the beams 20 and 21 of the cutter frame adjacent and below the driving shaft 31, and also by rods 42 which extend upwardly and forwardly and are secured at their upper ends by means of nuts 43 in an angle iron 44, which extends transversely of and is secured to the lower side of the beams 20 and 21 adjacent and below the shaft 34. Thus it will be seen that the cutting member is supported by three sets of rollers of three each and that each ring is engaged at three points in its periphery. It is to be understood that the number of sets of supporting rollers may be varied to suit requirements.

The mechanism for driving the traction plow and for operating the cutting member will now be described, special reference being had to Figs. 1, 2 and 3. The crank shaft of the engine, shown at 45, is provided with a gear 46 shown most clearly in Fig. 3, which can be connected to the shaft by a clutch $46^a$, the clutch operating mechanism not being shown. The gear 46 meshes with a master driving gear 47 which is mounted upon a shaft 48 suitably supported upon the truck and engine frame. Fixed to the end of the shaft 48 is a sprocket wheel 49, which drives the rear axle and rear ground wheels so as to move the plow along the ground by means of a sprocket chain 50 and a sprocket member 51 which is on the rear axle intermediate the ground wheel and the truck frame, said sprocket member 51 being a part of a differential mechanism 52 of a well known type.

The cutting member is rotated in the following manner. Mounted on the shaft 48 intermediate the master wheel 47 and truck beam 12 is a sprocket wheel 53 which drives a shaft 54 by means of a sprocket chain 55 and a sprocket wheel 56 fixed to the shaft 54, the latter being suitably mounted in bearings on the truck. The shaft 54 is provided at its outer end with a sprocket wheel 57 which drives a shaft 58 mounted in bearings on two large uprights 59 and 60 and a shorter upright 61 at the rear end of the truck frame, by means of a sprocket chain 62 and a gear wheel 63 which is mounted on the shaft 58 and may be connected thereto so as to form a driving connection by means of a clutch 64, the mechanism for operating the clutch not being shown. Also mounted on the shaft 58 intermediate the truck beams 11 and 12 and between the uprights 59 and 60 is a second sprocket wheel 65 which drives a shaft 66 mounted in bearings on the top of the pivoted cutter frame between the truck frame and the rotary cutting member, by means of a sprocket chain 67 and a sprocket wheel 68, the latter being fixed to the shaft 66 at the middle thereof. Fixed to the ends of the shaft 66 on the outside of the arms 20 and 21 of the cutter frame are sprockets 69 and 70 which drive the shaft 31 which has been referred to heretofore, by means of two driving chains 71 and 72 and two sprocket wheels 73 and 74, fixed to the outer ends of the shaft 31. Thus it will be seen that when the engine is in operation and the gear 46 is clutched to the shaft 45 the plow will be moved along the ground by means of gear 46, master driving gear 47, shaft 48, sprocket 49, sprocket chain 50, sprocket member 51, connected to the differential mechanism and the rear axle 13. It will also be seen that, when the sprocket 63 is clutched to the shaft 58, the cutting member will be rotated so as to cut the ground by means of gear 46, master driving gear 47, shaft 48, sprocket 53, sprocket chain 55, sprocket 56, shaft 54, sprocket 57, sprocket chain 62, sprocket 63, shaft 58, sprocket 65, sprocket chain 67, sprocket 68, shaft 66, sprockets 69 and 70, sprocket chains 71 and 72, sprocket wheels 73 and 74, shaft 31, driving members 32 on said shaft 31 and toothed member 29 on the faces of the rings of the cutting member.

The pivoted cutter frame is arranged to be raised or lowered so as to adjust the cutting member for different depths of cut, on account of obstructions or inequalities of the ground, or to raise the cutting member out of cutting position, by mechanism which will now be described. At the outer free end of the cutter frame is a pair of brackets 75 around which extends a supporting cable 76 preferably a wire cable, the ends of said cable passing around a pair of winding drums 77 and 78, which are fixed to a shaft 79 mounted in bearings on the top of the two uprights 59 and 60. One end of the shaft 79 projecting beyond the upright 59, is provided with a large gear wheel 80. Mounted in bearings 81 on the sides of the uprights 59 and 60 below the shaft 79 is a shaft 82 provided with a smaller gear 83, which meshes with the gear 80 on the shaft 79, and provided also, beyond the small gear 83, with a sprocket wheel 84. This sprocket wheel 84 is connected by means of a sprocket chain 85 to a smaller sprocket wheel 86 mounted upon a shaft 87 supported upon the truck frame and provided with a hand wheel 87ª. At 88 is shown the operator's platform from which he can operate the hand wheel 87, for raising and lowering the cutter frame, the steering mechanism part of which is shown at 89, and the other operating parts.

I do not desire to be confined to the exact details shown but aim in my claims to cover all modifications which do not involve the departure from the spirit and scope of my invention.

Having described my invention, I claim:

1. In a plow, a truck frame, a pivoted cutter frame mounted thereon, a rotary cutting member carried by said cutter frame, said cutting member comprising a number of rings arranged at the ends and intermediate the ends of the cutting member and a plurality of cutters extending across and secured to said rings, and means for supporting said rotary cutting member comprising a plurality of rollers engaging the inner peripheries of all of said rings.

2. In a traction plow, a traction frame having a driving engine, a pivoted cutter frame carried by said traction frame, a rotary ground cutting member of considerable length comprising a plurality of rings arranged in parallel planes at the ends and intermediate the ends of the cutting member and a plurality of cutters extending across and secured to said rings, and means for rotatably supporting said cutting member in said pivoted cutter frame comprising a plurality of rollers supported by said frame and engaging the inner peripheries of all said rings.

3. In a plow, a truck frame and a ground cutting member comprising a rotary hollow drum or cylinder comprising a number of spaced rings and blades or cutters secured to said rings, and means for supporting said rotary cutting member at its ends and intermediate its ends.

4. In a plow, a truck frame, a cutter frame pivotally supported thereon, a rotary cutting member comprising a plurality of spaced rings and blades or cutters secured to said rings, and means for supporting said rotary cutting member in said cutting frame, comprising a plurality of rollers engaging said rings at the ends of the cutting member and intermediate its ends.

5. In a plow, a truck frame, a cutter frame supported thereby a rotary cutting member, said cutting member being in the form of a hollow drum or cylinder consisting of a number of rings arranged in parallel planes at the ends and intermediate the ends of the drum and a plurality of cutters extending across and secured to said rings, and means for driving said drum comprising gear members engaging said drum at its ends and intermediate its ends.

6. In a plow, a truck frame, a cutter frame carried thereby, a rotary cutting member mounted in said cutter frame, said cutting member being in the form of a hollow drum or cylinder having at its ends and intermediate its ends three or more rings and cutters extending across and secured to said rings, and means for driving said rotary cutter comprising gears on the sides of all of said rings.

7. In a plow, a truck frame, a cutter frame, a rotary cutting member supported thereby, said cutting member being in the form of hollow drum or cylinder having at least three spaced rings and cutters extending across and secured to said rings, means for supporting said cutting member for rotary movement comprising a plurality of rollers engaging each of said rings at a number of points on its inner periphery, and means for driving said rotary member comprising crown gears on the sides of said rings and a driving shaft having gears engaging said crown gears.

8. In a plow, a truck frame, a cutter frame, a rotary cutting member mounted therein, said cutting member being in the form of a hollow drum or cylinder and comprising at least three spaced rings and a number of blades or cutters extending across and secured to said rings, each of said rings having on one face a crown gear, a driving and supporting shaft mounted on said cutter frame and having driving and supporting members in the planes of the rings, each of said members having a toothed portion engaging said crown gear on the face of the corresponding ring and a grooved portion engaging the inner periphery of said ring, and additional supporting rollers engaging said rings.

9. In a plow, a truck frame, a cutter frame carried thereby, a rotary cutting member in the form of a hollow drum or cylinder mounted in said cutter frame, said drum comprising rings at the ends and intermediate the ends thereof and cutter blades extending across and secured to said rings, and means for supporting said cutting member for rotary movement comprising a plurality of shafts extending through the rotary cutting member and supported on the cutter frame, each of said shafts having grooved rollers engaging the inner peripheries of the rings.

10. In a plow, a truck frame, a pivoted cutter frame supported thereby, a rotary cutting member in the form of a hollow drum or cylinder mounted in said cutter frame, said cutting member being formed of a number of spaced rings arranged at the ends and intermediate the ends thereof and blades or cutters extending across and secured to said rings, means for supporting said cutting member for rotary movement comprising shafts, which extend through the cutting member and are supported on the cutter frame, said shafts having grooved rollers which engage the inner peripheries of the end and intermediate rings, gears on the faces of the said rings, one of said shafts being a driving shaft and having gears which engage the gears on the rings.

11. In a traction plow, a traction frame having a driving engine, a pivoted cutter frame supported at the end of said traction frame, a rotary cutting member mounted in said cutter frame, said cutting member being in the form of a hollow cylinder or drum and being composed of at least three spaced rings and a number of cutters extending across and secured to said rings, each of said rings having a gear on one side thereof, means for supporting said rotary cutting member at the ends and intermediate the ends thereof comprising a plurality of transverse shafts extending through the cutting member at different points near the inner periphery thereof, said shafts having grooved rollers which engage the inner edges of the flat rings, the rollers on one of said shafts having gear teeth which engage the gears on said rings, means for rotating said cutting member from said engine and means for raising and lowering said cutter frame and cutting member.

In testimony whereof I affix my signature in presence of two witnesses.

SEABURY N. E. PRIDDY.

Witnesses:
 JOHN E. PRIDDY,
 TOM D. PRIDDY.